June 28, 1932.  J. W. HANSEN ET AL  1,864,650

SYNCHRONOUS SELF STARTING MOTOR

Filed Feb. 9, 1931

INVENTOR
JULIUS W. HANSEN.
WILLIAM L. HANSEN.
BY  IRA N. HURST.
Toulmin & Toulmin
ATTORNEY Patented June 28, 1932

1,864,650

UNITED STATES PATENT OFFICE

JULIUS W. HANSEN, WILLIAM L. HANSEN, AND IRA N. HURST, OF PRINCETON, INDIANA, ASSIGNORS TO HANSEN MANUFACTURING COMPANY, INC., OF PRINCETON, INDIANA, A CORPORATION OF INDIANA

SYNCHRONOUS SELF-STARTING MOTOR

Application filed February 9, 1931. Serial No. 514,336.

Our invention relates to synchronous, self-starting motors.

It is the object of our invention to provide a synchronous, self-starting motor, particularly useful in connection with clocks.

In particular, it is our object to provide a multi-polar motor with a bridging ring of our invention to provide for a self-starting motor with a rotor whose periphery has regular indentations, having the advantage of geometrical and geographical poles but still having the advantages of a self-starting motor.

It is our further object to provide a motor with a very narrow air gap, thereby producing high efficiency with a motor of minimum size, and it is our object to provide a rotor with a periphery having toothed segments on the margin thereof for the purpose of inducing the starting of the motor.

It is our further object to provide such a motor having fields, a portion of which lag behind the other portion.

It is our particular object to provide a synchronous, self-starting motor having a hardened steel bridging ring and a soft steel rotor.

This application is in part a continuation of application Ser. No. 362,356, patented Sept. 15, 1931, No. 1,823,601, filed May 11, 1929.

Referring to the drawing.

Figure 1:
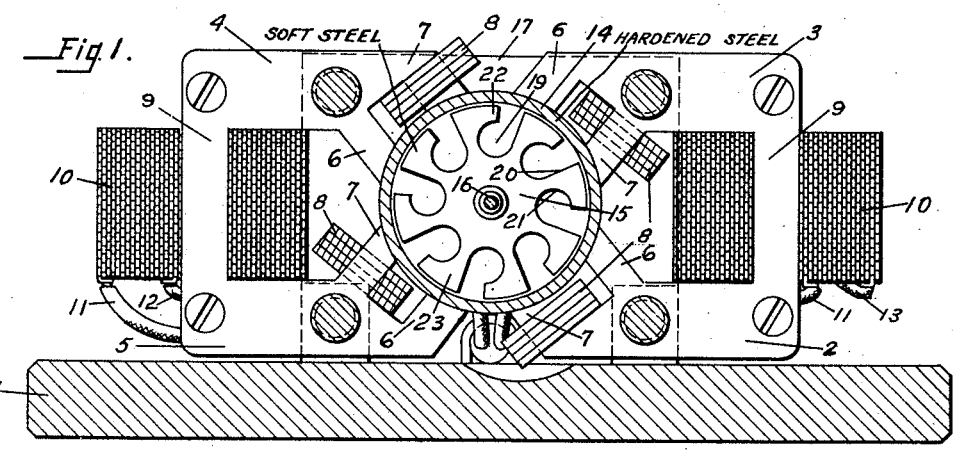
Figure 1 is a vertical longitudinal section through the motor.
Figure 2:
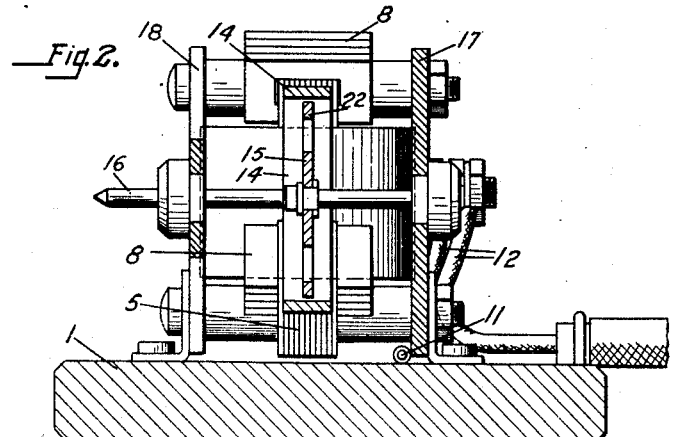
Figure 2 is a vertical transverse section through the motor.

Referring to the drawing in detail, the motor of our invention is mounted upon the base 1, or any other suitable support. Upon this base are mounted the arms 2, 3, 4 and 5, each arm having an arcuate pole face divided into pole portions 6 and 7, the portion 7 having a plurality of shading coils 8.

The arms 2 and 3 and the arms 4 and 5 are joined together by their respective bridge pieces 9 around which are wrapped the field coils 10. These coils are connected together by the wire 11, the respective ends of the wire being designated 12 and 13, suitably connected into an alternating current circuit.

Mounted upon the arcuate ends of the bifurcated pole portions 6 and 7 is a hardened steel collector ring 14, which is preferably glass hard. This hardened steel magnetic bridging ring is fundamentally one of the important features of our invention. Within this hardened steel ring and closely adjacent to it, separated from it by a very narrow air gap, is a soft steel rotor 15 mounted on the shaft 16, suitably supported in the supporting plates 17 and spider 18.

This rotor is provided with a plurality of slots 19, each having a straight face 20 and an arcuate face 21 and provided with an overhanging hook 22 formed on the outwardly extending finger piece 23.

Our motor is self-starting and operates synchronously.

The rotor is made of magnetic material, of which material soft carbon steel is a good example.

The purpose of the hardened steel ring 14 is to concentrate the magnetism between the field pole pieces and it also tends to collect the stray lines of magnetism between the pole pieces, thereby making the motor more efficient. The steel ring may be made of carbon steel or other material having reluctance to the passage of magnetic lines of force. The rotor has double the number of pole pieces that the stator has and this rotor is made of magnetizable materials. In the particular embodiment disclosed in our application, we have shown four poles in the stator and eight pole pieces in the rotor, but we do not wish to confine this invention to any particular number. The projections 22 of the rotor cooperate with the shading coils 8 of the field pole pieces in such a manner as to create a rotating field flux in the same direction in which the projections extend.

It will be understood that we desire to comprehend within our invention such modifications as may be clearly embraced within the scope of our claims and invention.

Having thus fully described our invention, what we claim as new and desire to secure by Letters Patent, is:

1. A synchronous self-starting motor having, in combination, a stator having means for producing a progressive, magnetic field, a hardened steel bridging ring mounted thereon, and a rotor with geometrical pole members revolving within said ring.

2. A synchronous self-starting motor having, in combination, a stator having means for producing a progressive, magnetic field, a hardened steel bridging ring mounted thereon, and a rotor with geometrical pole members revolving within said ring, said rotor being composed of magnetic materials such as soft steel.

3. In a synchronous self-starting motor, a stator, shading coils mounted thereon, a hardened steel ring mounted on said stator, and a geometrically polar rotor mounted within said ring, said rotor having a plurality of radially arranged projections with slots therebetween.

4. In a synchronous self-starting motor, a stator, shading coils mounted thereon, a hardened steel ring mounted on said stator, and a rotor mounted within said ring, said rotor having a plurality of radially disposed projections forming slots, and horns on said rotor projections extending over a portion of said slots.

5. In a synchronous self-starting motor, a stator, shading coils mounted thereon, a hardened steel ring mounted on said stator, and a rotor mounted within said ring, said rotor having a plurality of radially disposed projections, and horns on said rotor extending laterally from the ends of the projections, said rotor being of soft steel.

6. In a synchronous self-starting motor, the combination of a stator having field coils and pole pieces of even number, shading coils mounted on said poles, a highly retentive magnetic stationary bridging ring mounted on the stator, and a radially slotted rotor within said ring having double the number of slots to the number of poles of the stator.

7. In a synchronous self-starting motor, the combination of a stator having field coils and pole pieces of even number, shading coils mounted on said poles, a highly retentive magnetic stationary bridging ring mounted on the stator, and a radially slotted rotor within said ring having double the number of slots to the number of poles of the stator, said rotor having horns projecting from said poles laterally from one pole towards the other.

8. In a synchronous self-starting motor, the combination of a stator having means for producing a progressive magnetic field, a highly retentive magnetic stationary bridging ring of hardened steel mounted on the stator, and a radially slotted rotor of soft steel revolving within said ring.

9. In a synchronous self-starting motor, the combination of a stator having means for producing a progressive magnetic field, a highly retentive magnetic stationary bridging ring of hardened steel mounted on the stator, and a radially slotted rotor of soft steel revolving within said ring, and horns on said rotor projecting partially across said slots therein.

In testimony whereof, we affix our signatures.

JULIUS W. HANSEN.
WILLIAM L. HANSEN.
IRA N. HURST.